United States Patent
Sales

(10) Patent No.: US 12,092,836 B2
(45) Date of Patent: Sep. 17, 2024

(54) OPTICAL ELEMENT AND OPTICAL SYSTEM

(71) Applicant: VIAVI SOLUTIONS INC., San Jose, CA (US)

(72) Inventor: Tasso R. M. Sales, Rochester, NY (US)

(73) Assignee: VIAVI SOLUTIONS INC., Chandler, AZ (US)

(*) Notice: Subject to any disclaimer, the term of this patent is extended or adjusted under 35 U.S.C. 154(b) by 277 days.

(21) Appl. No.: 16/661,620

(22) Filed: Oct. 23, 2019

(65) Prior Publication Data

US 2020/0133012 A1    Apr. 30, 2020

Related U.S. Application Data

(60) Provisional application No. 62/751,311, filed on Oct. 26, 2018.

(51) Int. Cl.
     *G02B 27/09*      (2006.01)
     *G02B 5/02*      (2006.01)

(52) U.S. Cl.
     CPC ....... *G02B 27/0927* (2013.01); *G02B 5/0215* (2013.01); *G02B 27/0916* (2013.01)

(58) Field of Classification Search
     CPC .............. G02B 5/0215; G02B 27/0927; G02B 27/0916
     USPC ........................................................ 359/599
     See application file for complete search history.

(56) References Cited

U.S. PATENT DOCUMENTS

| | | | |
|---|---|---|---|
| 5,534,386 A | 7/1996 | Petersen et al. | |
| 5,589,982 A | 12/1996 | Faklis et al. | |
| 6,278,550 B1 | 8/2001 | Kathman et al. | |
| 6,859,326 B2 | 2/2005 | Sales | |
| 7,033,736 B2 | 4/2006 | Morris et al. | |
| 7,813,054 B2 | 10/2010 | Sales | |
| 2004/0130790 A1* | 7/2004 | Sales .................. | G02B 27/0961 359/619 |

(Continued)

FOREIGN PATENT DOCUMENTS

| | | |
|---|---|---|
| EP | 3165873 A1 | 5/2017 |
| JP | 2007248757 | 9/2007 |

(Continued)

OTHER PUBLICATIONS

I. M. Barton, P. Blair, and M. Taghizadeh, "Dual-wavelength operation diffractive phase elements for pattern formation," Optics Express, vol. 1, No. 2, Jul. 21, 1997, pp. 54-59.

(Continued)

*Primary Examiner* — Wyatt A Stoffa
*Assistant Examiner* — Mitchell T Oestreich
(74) *Attorney, Agent, or Firm* — Mannava & Kang, P.C.

(57) ABSTRACT

An optical element including a body of optical material; and a plurality of microstructures along a surface of the body, wherein each microstructure of the plurality of microstructures has a sag profile. An optical system can include a light source; and an optical element having a body of optical material and a plurality of microstructures along a surface of the body, wherein each microstructure of the plurality of microstructures generates a super-cosine intensity profile that provides an irradiance over a field of view. Methods of making and using the optical element and optical system are also disclosed.

18 Claims, 14 Drawing Sheets

(56) References Cited

U.S. PATENT DOCUMENTS

| | | | |
|---|---|---|---|
| 2007/0223249 A1* | 9/2007 | Lee | G02B 6/0053 |
| | | | 362/613 |
| 2010/0033829 A1 | 2/2010 | Wippermann et al. | |
| 2010/0033989 A1* | 2/2010 | Teng | G02B 6/0038 |
| | | | 362/625 |
| 2013/0329460 A1* | 12/2013 | Mathew | G06F 1/1637 |
| | | | 362/612 |
| 2018/0198254 A1 | 7/2018 | Tatum et al. | |

FOREIGN PATENT DOCUMENTS

| | | | |
|---|---|---|---|
| JP | 2013122566 | 6/2013 | |
| JP | 2014167550 | 9/2014 | |
| JP | 2017026662 | 2/2017 | |
| KR | 10-2006-0051369 A | 5/2006 | |
| TW | 200643469 A | 12/2006 | |
| WO | 02/10804 A1 | 2/2002 | |
| WO | 2004027495 A2 | 4/2004 | |
| WO | 2008/043491 A2 | 4/2008 | |
| WO | WO-2013029400 A1 * | 3/2013 | .............. F21V 5/004 |
| WO | 2017/204748 | 11/2017 | |

OTHER PUBLICATIONS

S. Noach, A. Lewis, Y. Arieli, and N. Eisenberg, "Integrated diffractive and refractive elements for spectrum shaping," Applied Optics, vol. 35, No. 19, Jul. 1, 1996, pp. 3635-3639.

Ying Tsung Lu and Sien Chi, "Fabrication of light-shaping diffusion screens," Opt. Communications 214 (2002), pp. 55-63.

\* cited by examiner

OPTICAL ELEMENT AND OPTICAL SYSTEM

RELATED APPLICATIONS

This application claims priority to U.S. Provisional Application No. 62/751,311, filed Oct. 26, 2018, the entire disclosure of which is hereby incorporated by reference.

FIELD OF THE INVENTION

The present invention relates to an optical element including a body of optical material; and a plurality of microstructures along a surface of the body, wherein each microstructure of the plurality of microstructures has a sag profile. An optical system can include a light source; and an optical element having a body of optical material and a plurality of microstructures along a surface of the body, wherein each microstructure of the plurality of microstructures generates a super-cosine intensity profile that provides an irradiance over a field of view. Methods of making and using the optical element and optical system are also disclosed.

BACKGROUND OF THE INVENTION

Applications of 3D sensing technology covers a variety of devices, such as mobile phones, computers, robots, virtual and augmented reality devices, automobiles, self-driving cars, home systems, gaming systems, security systems, and military applications. While there are various strategies for implementing 3D sensing, such as for optical sensing, gesture recognition, depth imaging, and the like, an infrared laser typically provides the illumination source, generally with wavelength around 850 nm, 940 nm, or longer, such as a VCSEL or side-emitting laser. Other sources such as LED's may also be used for this application. The laser radiation from the source goes through a beam shaping device that spreads the infrared illumination over a certain scene, defined by an angular field of view (FOV) or a specific target a certain distance away. Some fraction of the radiation scattered by the scene is reflected, collected by a lens, and focused onto a sensor. The signal detected at the sensor is then processed to extract information about the object(s) in the scene, such as their features and locations. Processing approaches for 3D sensing include time-of-flight (ToF), structured light, and stereoscopic imaging. The ToF approach requires proper scene illumination, which can be accomplished by a diffuser, while the other two approaches typically illuminate by a diffractive optical element, diffuser, or a microlens array.

There is a variety of conventional approaches for diffusing an optical beam from an illumination source. A simple form of beam shaping and homogenization is provided by Gaussian diffusers, defined by a surface with random height variations. Some examples include ground glass and some types of chemically etched glass surfaces. Gaussian diffusers spread an input illumination beam over a certain angle range with Gaussian intensity profile. Such beam shapers are easy to fabricate, but offer very limited beam shaping capabilities, poor uniformity, and limited light concentration.

An improved type of homogenization apparatus for diffusion can be fabricated by holographic exposure of laser speckle patterns, as described for example in "Fabrication of light-shaping diffusion screens," Ying Tsung Lu and Sien Chi, Opt. Communications 214 (2002), 55-63, and U.S. Pat. No. 5,534,386 to Petersen et al. These so-called holographic diffusers provide more flexibility compared to ground glass with better angle control and distinct angular divergence along two distinct directions. However, the typical intensity scatter profile for holographic components is also Gaussian with poor uniformity and limited light concentration. As a result, such diffusers are unsuitable for the type of uniform illumination required by 3D sensing applications.

Another approach to achieve beam shaping and homogenization is based on diffractive optical elements (DOE's), as described for example in "Laser beam shaping," J. R. Leger, in Micro-Optics: Elements, Systems, and Applications, H. P. Herzig, Ed., Taylor & Francis, May 1997, and U.S. Pat. No. 6,278,550 to Kathman et al., which utilize interference and diffraction effects to shape an input beam into a wide variety of patterns. The problems with diffractive elements, however, arise with the large divergence angles required for 3D sensing. A DOE that produces a wide FOV can be very challenging to manufacture without a strong hot spot collinear with the input beam (i.e., at the zero diffraction order). Diffractive elements are also best suited for monochromatic operation and are generally designed to operate at a specific wavelength. Operating under a different wavelength generally results in the appearance of strong zero diffraction order. For example, a DOE designed for use with light at 850 nm would likely be unsuitable with light at 940 nm, not only because of the zero order, but because the angular spread depends on the wavelength. While it may be possible to design diffractive elements that could in principle operate under several discrete distinct wavelength values, such as described for example in S. Noach, A. Lewis, Y. Arieli, and N. Eisenberg, "Integrated diffractive and refractive elements for spectrum shaping," Appl. Opt. 35, (1996) 3635-3639, U.S. Pat. No. 5,589,982 to Faklis et al., or I. M. Barton, P. Blair, and M. Taghizadeh, "Dual-wavelength operation diffractive phase elements for pattern formation," Opt. Express 1, (1997) 54-59, but the wide angles required and the tight fabrication tolerances pose significant challenges.

Microlens-based diffusers are described for example in U.S. Pat. No. 6,859,326 to Sales, U.S. Pat. No. 7,033,736 to Morris et al., and U.S. Pat. No. 7,813,054 to Sales, may provide a more effective approach to provide proper illumination for 3D sensing applications. However, the diverging nature of the typical source for 3D sensing poses additional problems related to efficiency and uniformity. These problems could in principle be solved with collimating optics, but that would require an increase in the size and complexity of the optical system, commonly referred to as the package size. As a result, the strong preference for a non-collimated source which is diverging in 3D sensing leads to a need for improved diffuser solutions that can maximize the quality of diffused illumination for 3D sensing systems without additional optics for collimation.

SUMMARY OF THE INVENTION

In an aspect, there is disclosed an optical element including a body of optical material; and a plurality of microstructures along a surface of the body, wherein each microstructure of the plurality of microstructures has a sag profile.

In another aspect, there is also disclosed an optical system including a light source; and an optical element including a body of optical material; and a plurality of microstructures along a surface of the body, wherein each microstructure of the plurality of microstructures has a sag profile.

In another aspect, there is further disclosed a method of using an optical system including radiating an optical element with energy from a light source, wherein the light source is a diverging light source; wherein the optical element includes a body of optical material, and a plurality of microstructures along a surface of the body, wherein each microstructure of the plurality of microstructures has a sag profile; and wherein each microstructure of the plurality of microstructures generates a super-cosine intensity profile that provides an irradiance over a field of view.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

DETAILED DESCRIPTION OF THE DRAWINGS

The present disclosure in its several aspects and embodiments can be more fully understood from the detailed description and the accompanying drawings, wherein:

FIG. 2A shows a hexagon shape and FIG. 2B shows a rectangle shape;

Figure 16:
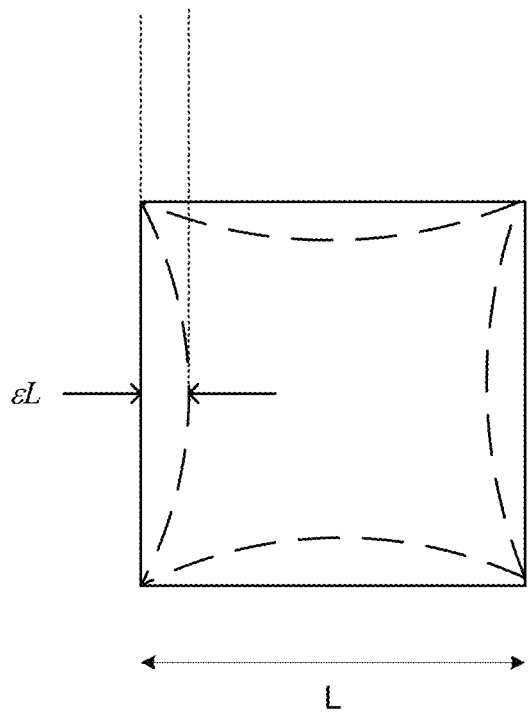
FIG. 16 is diagram of a square microstructure of size L (solid boundary) modified to incorporate pincushion outer boundary (dashed boundary)
Figure 17A:
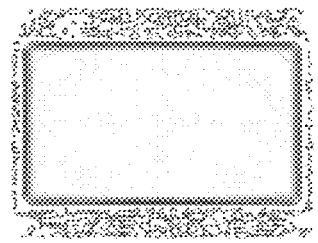
FIG. 17A is a contour map of the irradiance pattern of the optical element of the present invention receiving collimated illumination.
Figure 17B:
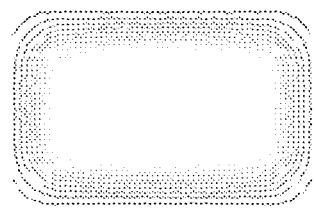
FIG. 17B is a contour map of the irradiance pattern of the optical element of the present invention receiving 30 degree diverging illumination.
Figure 17C:
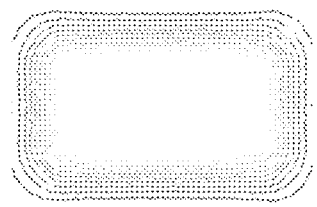
FIG. 17C is a contour map of irradiance pattern of the optical element of the present invention receiving 30 degree diverging illumination with pincushion shapes with increasing degree or amount of pincushion distortion of each square side of the microstructures based on a parameter ε of FIG. 16, where ε is 0.026.
Figure 17D:
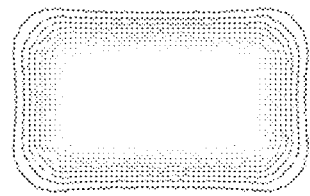
Figure 17E:
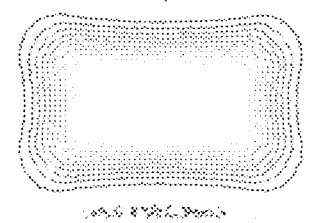

FIG. 17D is a contour map of irradiance pattern of the optical element of the present invention receiving 30 degree diverging illumination with pincushion shapes with increasing degree or amount of pincushion distortion of each square side of the microstructures based on a parameter ε of FIG. 16, where ε is 0.056; and FIG. 17E is a contour map of irradiance pattern of the optical element of the present invention receiving 30 degree diverging illumination with pincushion shapes with increasing degree or amount of pincushion distortion of each square side of the microstructures based on a parameter ε of FIG. 16, where ε is 0.091.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings.

Accordingly, it is an object of the present invention to provide an improved optical element 10 for diffusing light in an optical system, such as a 3D sensing systems. The optical element 10 can provide optimal efficiency and uniformity, for example, when operating with a light source in an optical system. In some cases, a 3D optical system can require uniform illumination of a field of view. In other cases, the illumination can be uniform in angle space. In yet other cases, the sensor needs to be uniformly illuminated. The optical element 10 can be tailored to any particular illumination requirement or geometry, independent of the operating wavelength. Furthermore, the optical element 10 can be matched to specific properties of a light source 14 to maximize operating performance. In summary, the optical element 10 can shape radiation into a prescribed illuminating pattern with an intensity profile and energy distribution for the illumination application.

Figure 1:
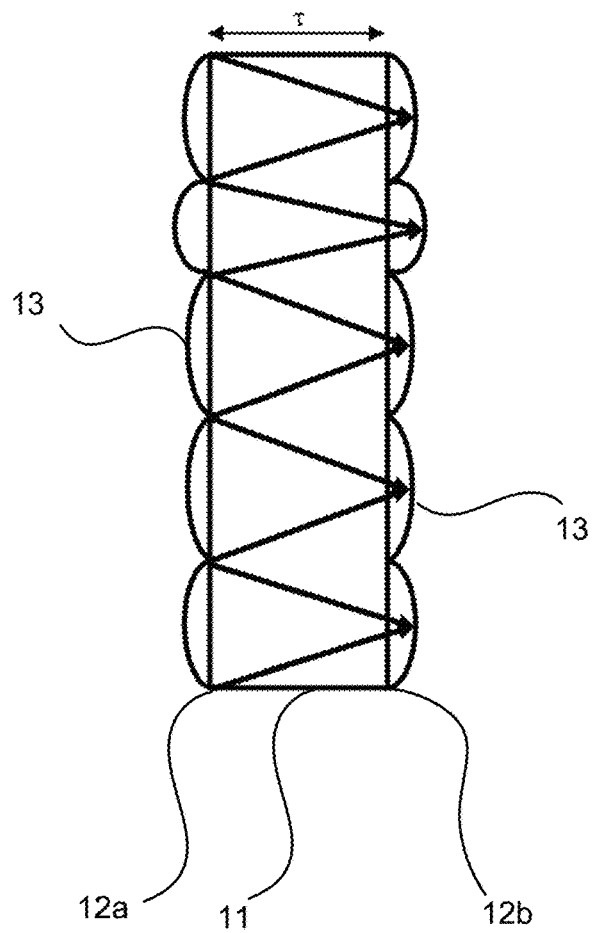
FIG. 1 is a block diagram of an optical element according to an aspect of the invention.

As shown in FIG. 1, the optical element 10 can include a body 11 of optical material. The optical material can be any material that can manipulate the flow of energy, such as light or electromagnetic radiation, in ultraviolet, visible, and infrared spectral regions. The optical material can be selected based upon properties of the materials, such as transparency, transmission, refractive index, etc. Non-limiting examples of an optical material can include glass or plastic, such as UV-curable polymers, polycarbonate, acrylic, fused silica, silicon or varieties thereof, such as amorphous silicon, and combinations thereof. The body 11 can be a single material or a composite of multiple materials, which may include substrates for mechanical support and other layers such as those for anti-reflection coating or other layers for other purposes, such as ITO and metal coatings. The body 11 can be a composite of different optical materials or a composite of multiple layers of a same optical material laminated together.

The body 11 of optical element 10 can include a surface 12. In an aspect, the body 11 can include two surfaces 12a and 12b which are oriented opposite one another. Each surface 12 can include a plurality of microstructures 13. In an aspect, each of the two surfaces 12a, 12b can include a plurality of microstructures 13. For example, surfaces 12a and 12b can be mirror images of each other, and can be faced in a confocal geometry, in which a microstructure 13 on first surface 12a (of the two surfaces) focuses radiation 17 onto its corresponding microstructure 13 on the oppositely oriented (mirrored) second surface 12b.

The optical element 10 can include a plurality of microstructures 13 along the surface 12 of the body 11. The microstructures 13 can be manufactured any method including, but not limited to, micro-replication, hot embossing, injection-molding, reactive-ion etching, or ion-beam milling, or single-point laser writing. Each microstructure 13 of the plurality of the microstructures 13 can the same or different with respect to one another based upon several variables relating the microstructure 13. The variables include shape, size, spatial location, and sag profile. A combination of random distribution in spatial location, sag profile, and/or size can provide the optical element 10 with advantages in regards to manufacturability, relative insensitivity to manufacturing errors, minimization of diffraction artifacts, and absence of hot spots that are generally detrimental to illumination applications.

In particular, each microstructure 13 of the plurality of microstructures 13 can be variously distributed with respect to each other along the surface 12 of the body 11. For example, the plurality of microstructures 13 can be uniformly distributed, periodically distributed, and/or randomly distributed over the surface 12 based upon the variables relating to the microstructure 13. In an aspect, the plurality of microstructures 13 can be spatially randomly distributed, can be randomly distributed in size along the surface 12, and/or randomly distributed based upon their sag profile. In this fashion, artifacts associated with a periodic array, such as moiré fringing or diffraction artifacts, can be minimized. In an aspect, the plurality of microstructures 13 can be randomly distributed along a surface 12 of the optical element 10.

Figure 2A:
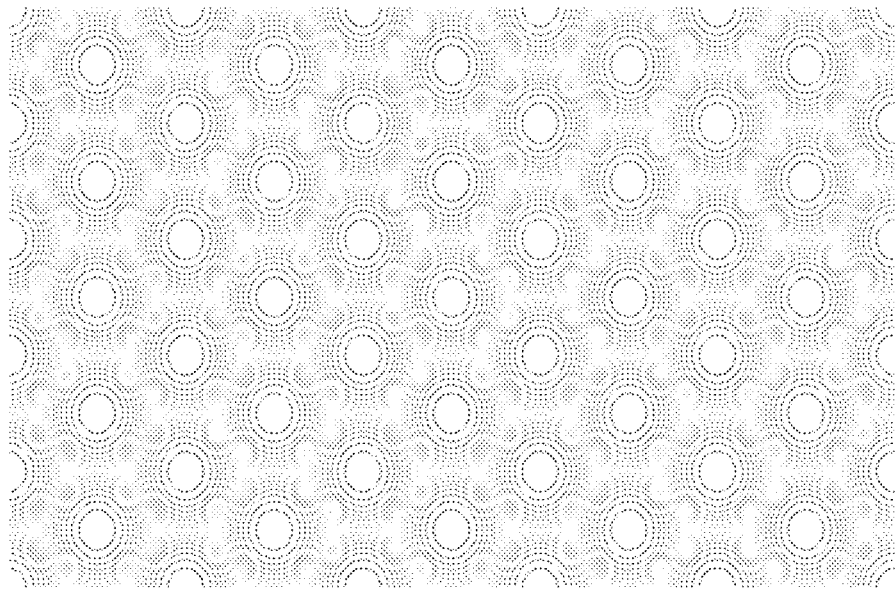
FIGS. 2A and 2B are contour-maps of an array of microstructures, where
Figure 2B:
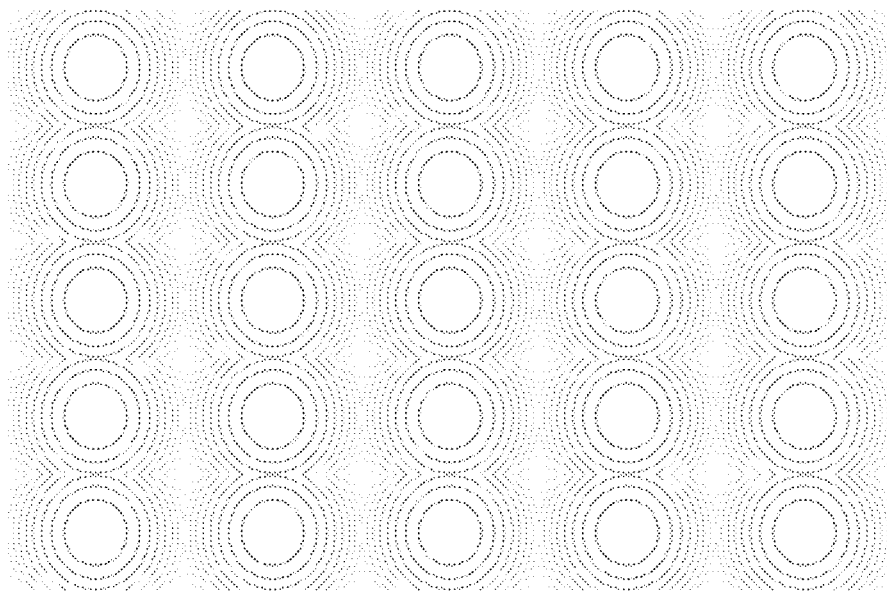

In another aspect, the plurality of microstructures 13 can be periodically distributed, such as in an array, to form, for example, a periodic microlens array along a surface 12 of the body 11. Examples of arrays with hexagonal and rectangular symmetry are shown in FIGS. 2A and 2B.

Each microstructure 13 can have any geometric shape, for example, a polygon, such as a rectangle, a square, a circle, a triangle, a pentagon, a hexagon, an octagon, and the like. The geometric shape of each microstructure 13 can have an outer boundary. For example, each microstructure 13 can have a rectangle shape with four outer boundaries in which each of the four outer boundaries inwardly curves toward a center of the microstructure 13 resulting in a pincushion shape. The inward curve can be selected in view of the type of light source 14, such as a diverging light source 14 or a collimated light source 14. In an aspect, each microstructure 13 of the plurality of microstructures 13 can have a pincushion shape and can be used when the optical element 10 is diffusing illumination from a diverging light source 14, such as a side-emitting laser or vertical-cavity surface-emitting laser (VCSEL). In an aspect, each microstructure 13 within the plurality of microstructures 13 can have a same shape. In another aspect, each microstructure 13 within the plurality of microstructures 13 can have a different shape. In another aspect, each microstructure 13 within the plurality of microstructures 13 can be the same shape or a different shape along each surface 12a, 12b of the body 11.

It should be noted that the outer boundary of the microstructures 13 can determine the kind of pattern produced along a field of view 16. As an example, a circular microstructure 13 can generate a circular pattern while a rectangular microstructure 13 can generate a generally rectangular pattern. It is possible to have situations where the outer boundary of a microstructure 13 is not directly correlated with a pattern produced along a field of view 16.

Figure 3A:
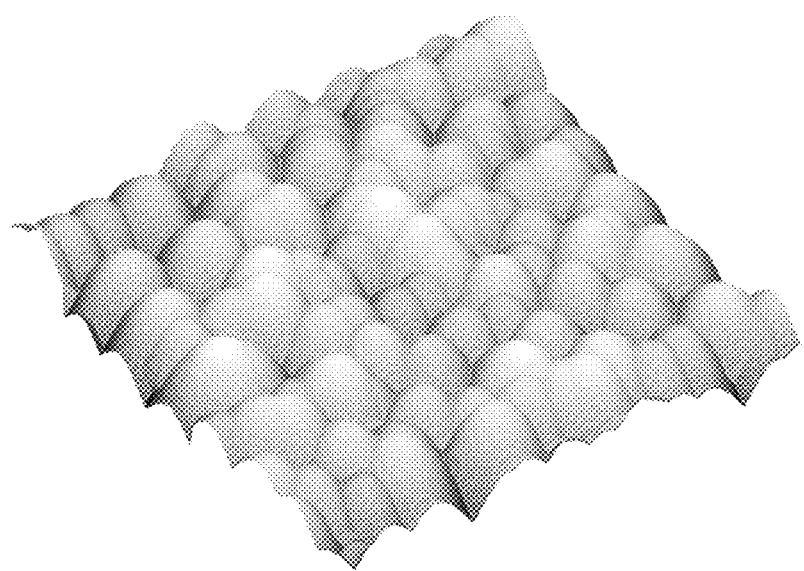
FIG. 3A is a perspective view of microstructures along a surface of an optical element according to an aspect of the invention, where the microstructures are randomized in size and location along the surface.
Figure 3B:
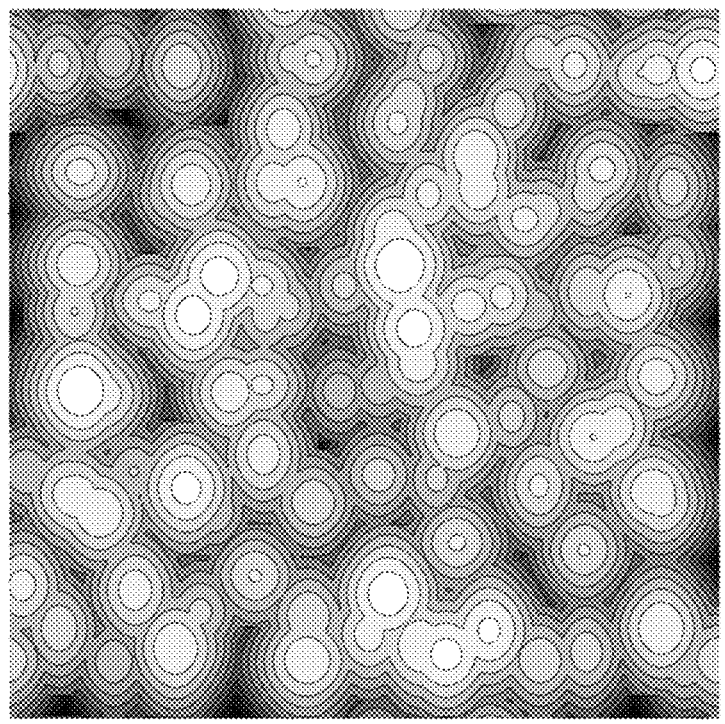
FIG. 3B is a contour-map of the surface of FIG. 3A.

The microstructures 13 can be any size and can vary based upon the microstructure 13 distribution. In an aspect, each microstructure of the plurality of microstructures 13 can be a same size or can be different sizes. The size of each microstructure 13 can vary over a specified range. An example of a randomized microstructure 13 along surface 12 is illustrated in FIGS. 3A and 3B for generating a super-cosine intensity profile (described more fully below) by radiation 17 upon a field of view 16, where p=3. For example, a total depth of a random pattern of microstructures 13 can be in the range of about 10 µm to about 50 µm along surface 12, but other ranges can be used.

Each microstructure 13 of the plurality of microstructures 13 can have a sag profile. The sag profile can provide an intensity profile, such as a super cosine intensity profile. Much like with size, shape, and space, the microstructures 13 can be distributed along a surface 12 based upon their sag profile. Software for determining the particular sag profiles of the microstructures 13 for example, may be implemented by direct programming using a computer language, such as C, or by software such as Mathematica or Matlab.

The sag profile of each microstructure 13 of the plurality of microstructures 13 can be defined by $s(x,y)=\Sigma_k\Sigma_p\alpha_{pk}x^p y_k$, (1) where (x,y) are coordinates on a local coordinate system of the microstructure 13, and p and k are integers varying from 1 to P and 1 to K, respectively. The values of P and K depend on the details of the super-cosine intensity profile, the field of view 16, as well as materials involved, being generally determined by numerical means, and wherein parameters $\alpha_{pk}$ can be optimized to achieve a specified field-of-view with a super-cosine intensity profile.

Alternatively, the sag profile of each microstructure 13 of the plurality of microstructures 13 can be defined by the equation:

$$s(x) = \frac{x^2}{R + \sqrt{R^2 - (\kappa + 1)x^2}}, \quad (2)$$

where R is a radius of curvature and k is a conic constant. Additional aspheric coefficients are not shown explicitly on Eq. (2) but could be also used. The parameters R and k can be optimized to achieve a specified field-of-view with a super-cosine intensity profile, in accordance with the diverging nature, if any of the light source 14. The radius of curvature can vary within a certain range $[R_{min}, R_{max}]$ and the conic constant k can also vary within a certain range $[K_{min}, K_{max}]$.

Each of the microstructures 13 can have a sag profile that generates a $$\frac{1}{\cos^p\theta}$$

intensity prone, such as a super-cosine intensity profile, in response to illumination from a light source 14 thereby providing radiation 15 over a field of view 16 with an angular range of $\theta$ at a selected power p. This will be discussed more fully with regard to an optical system. In an aspect, the sag profile of each microstructure 13 of the optical element 10 can provide a super-cosine intensify profile shaping function and can incorporate a pre-defined amount of pincushion distortion. The pincushion distortion can compensate for any effects on pattern shape due to a diverging light source 14. In this matter, the optical element 10 can illuminate an area with uniform intensity and/or irradiance over an angular field of view 16.

Figure 4:
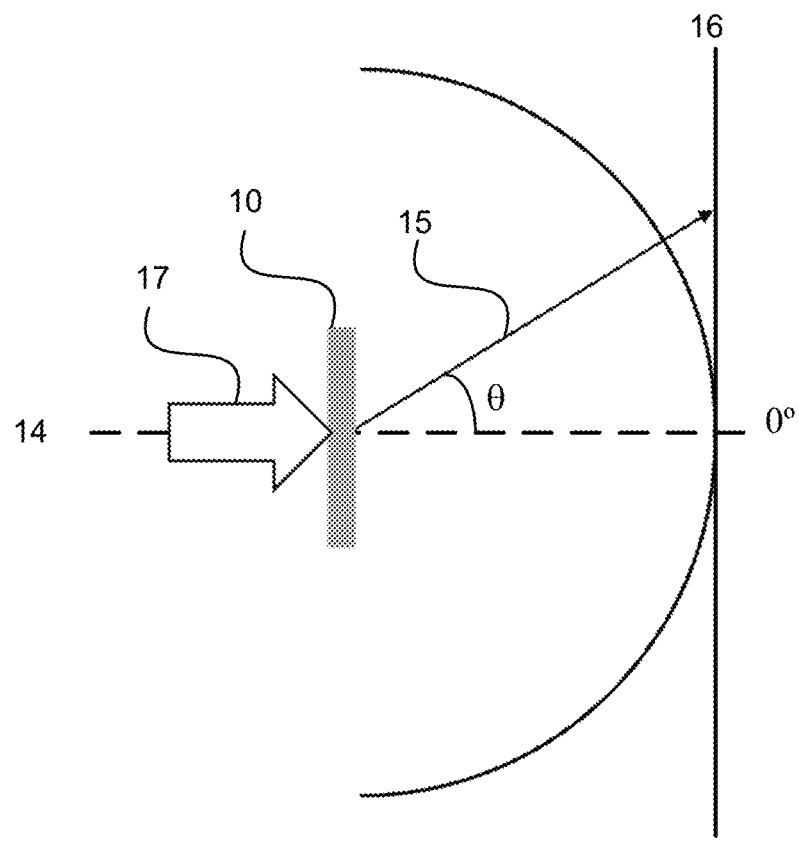
FIG. 4 is a diagram of an optical system according to an aspect of the invention.

As shown in FIG. 4, the optical element 10 can be used in an optical system 30. The optical system can be useful in providing illumination for 3D sensing of object(s), such as those based on time-of-flight. The optical system 30 can include a light source 14; and an optical element 10 having a body 11 of optical material and a plurality of microstructures 13 along a surface of the body 11, wherein each microstructure 13 of the plurality of microstructures 13 generates a super-cosine intensity profile that provides an irradiance over a field of view 16.

The surface 12 of optical element 10 utilizes surface slopes in the interface between two optically distinct media to deflect light rays of radiation 17 and direct them in particular directions. The microstructures 13, can be defined by a continuous distribution of slopes, can therefore spread radiation 17 (from either a collimated or diverging light source 14) into a particular region of space with an intensity profile. "Optically distinct media" means two media with different indices of refraction, such as a polymer or glass providing the materials of body 11 of optical element 10, and air or silicon and glass providing materials of body 11.

The distribution of light scattered by the optical element 10 can be governed by the distribution of slopes that characterize the microstructures 13. The distribution of light can in some cases, be defined in numerical fashion by direct optimization. In other cases, the distribution of light can be expressed in terms of the profile of the microstructures 13.

Figure 5:
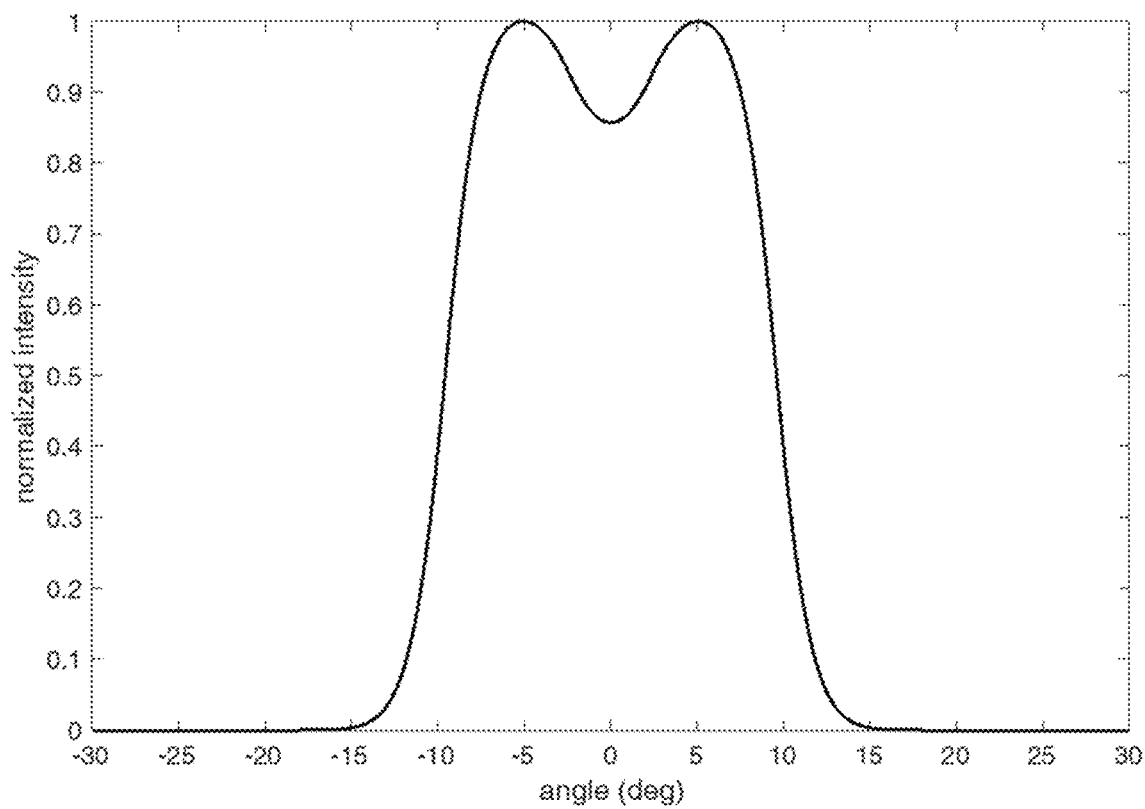
FIG. 5 is a representative example of the far-field intensity pattern of a diverging light source for use in an optical system.

The light source 14 can be a diverging (uncollimated) light source. Non-limiting examples of a diverging light source include a vertical cavity surface emitting laser (VCSEL), a side-emitting laser, or a light emitting diode (LED). Where the light source 14 is diverging, the sag profile of each microstructure 13 can provide the desired super-cosine intensity profile. A diverging light source 14 can have an angular spread, typically in the range of about 15 degrees to about 30 degrees, full-width. An example of a typical VCSEL divergence pattern is shown in FIG. 5. In this particular example, the full-width measured at the $e^{-2}$ level is about 23 degrees. Also very commonly observed with VCSELs is the dip observed at the center of the pattern.

Figure 6A:
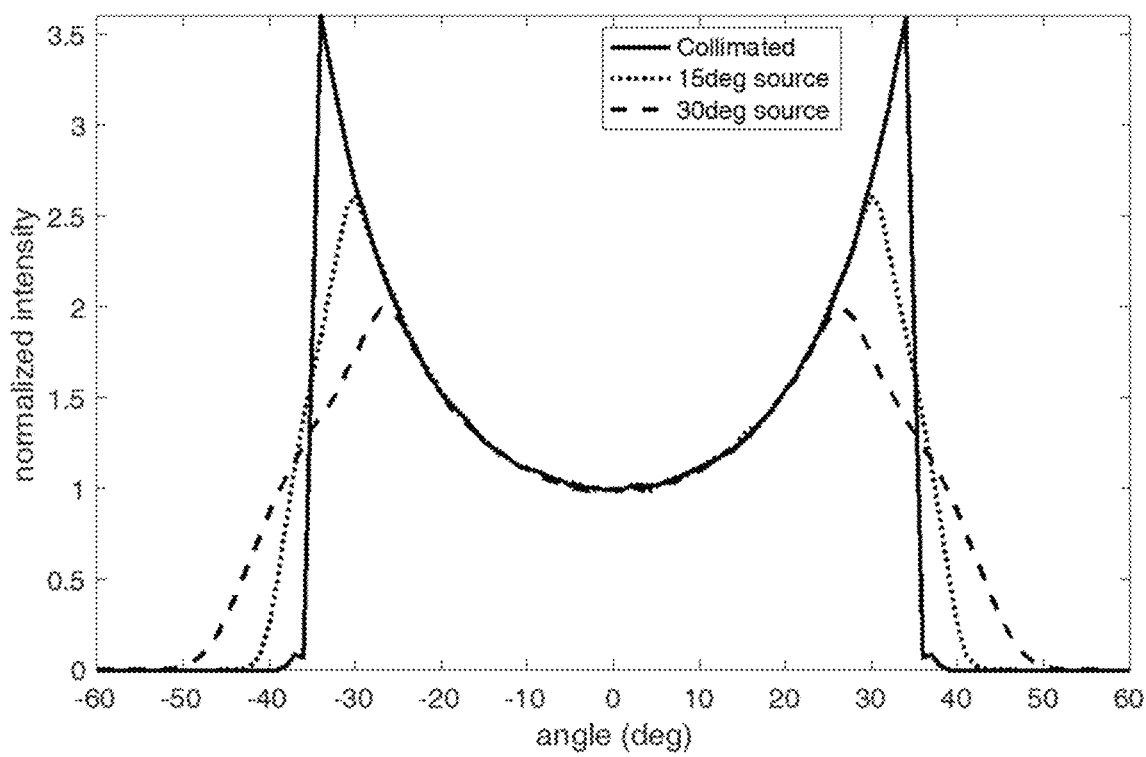
FIG. 6A is a graph of intensity over angular field of an optical system with a collimated light source and an optical element.
Figure 6B:
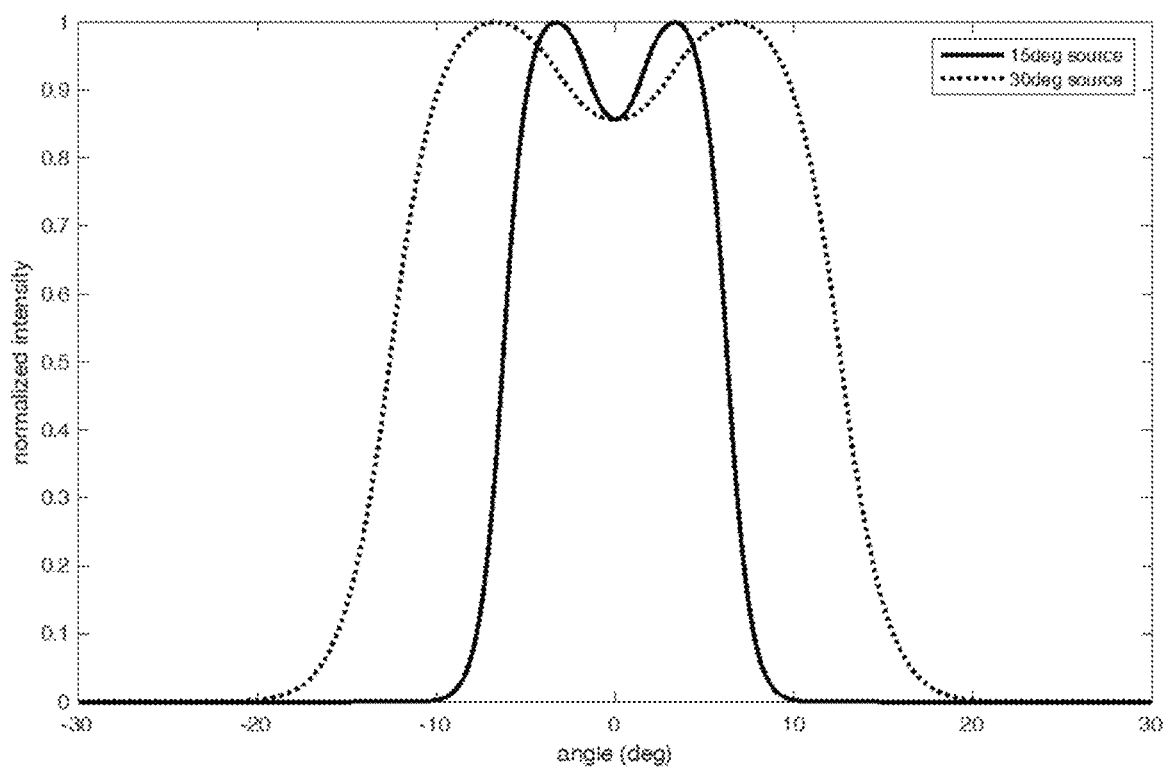
FIG. 6B is a graph of intensity over an angular field of view of an optical system with a divergent light source and an optical element.

The main effect of a diverging light source 14 can be to widen the pattern produced by the optical element 10 as well as to round sharp edges and corners. This phenomenon is illustrated in intensity versus angle graph of FIG. 6A in the case of an idealized super-cosine one-dimensional profile for collimated (no diverging illumination), 15 degree radiation 17, and 30 degree radiation 17 to the optical element 10, where FIG. 6B illustrates 15 degree and 30 degree diverging radiation 17 to the optical element 10. With a diverging light source 14 the position of the peaks moves towards narrower angles while the pattern width increases. Under collimated illumination the pattern features are sharp and well concentrated as desired, while under diverging illumination the sharp features become broadened. In this particular, example the diffuser pattern produced a super-cosine pattern with power p=7.

The light source 14 can be a collimated light source. In an aspect, the optical element 10 can diffuse a radiation 17 from a collimated light source 14. In particular, the radiation 17 can be diffused over an angular field of view 16. The light source 14 can be separated from the optical element 10 by distance $d_{VD}$.

With reference to FIG. 4, the optical element 10 can spread the radiation 15 with a $\cos^{-3}\theta$ intensity profile to provide an irradiance over the field of view 16, wherein an outer edge of the irradiance over the field of view is uniform. In a typical case of 3D sensing applications, the distribution of the radiation 15 can be a rectangle shape at the field of view 16. Typical angles along a wide and narrow direction can be in a range of from about 50 degrees to about 120 degrees, such as 60 degrees to about 110 degrees, and as an example, from about 70 degrees to about 100 degrees.

Figure 7:
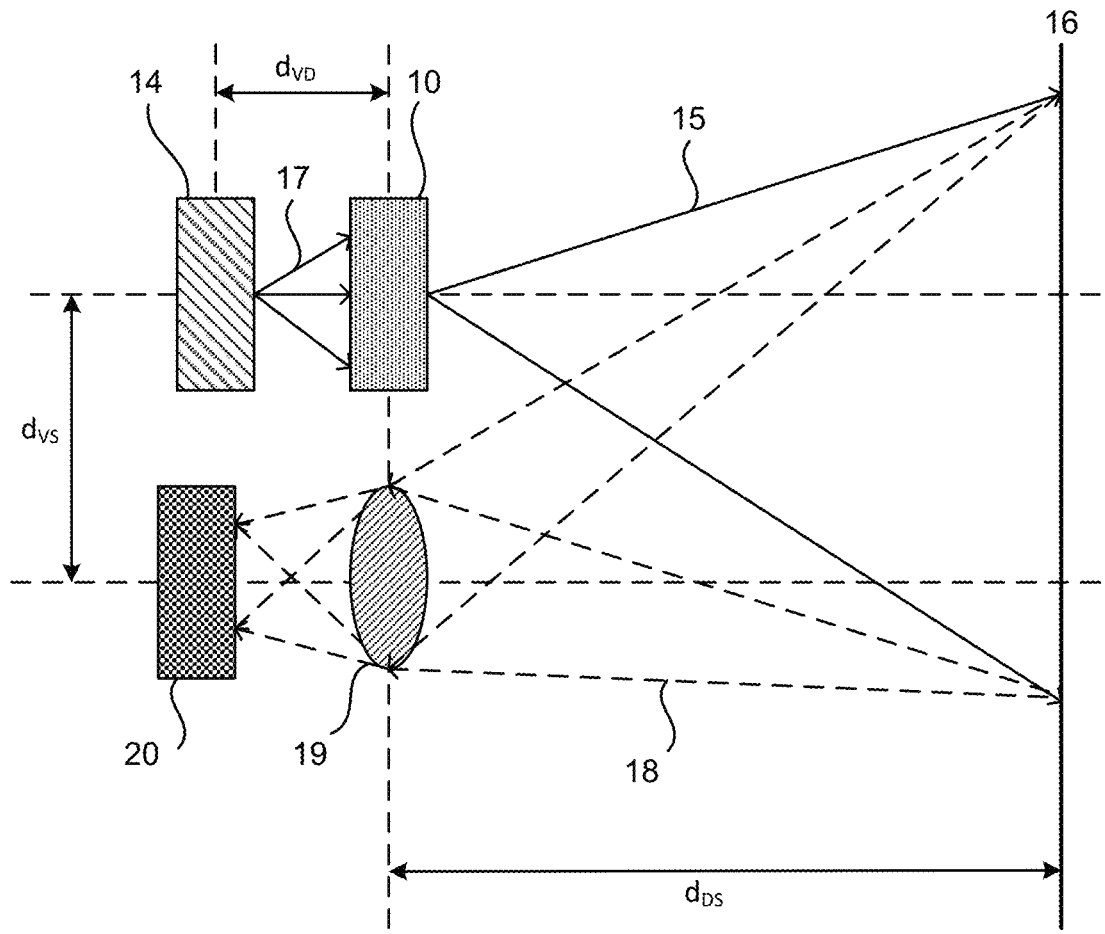
FIG. 7 is diagram of an optical system according to another aspect of the invention.

In another aspect, there is disclosed an optical system 300 as shown in FIG. 7. Radiation 17 from the light source 14 is incident on optical element 10 having a plurality of microstructures 13 along surface 12a facing the light source 14. This radiation 17 leads to a $\cos^{-4}\theta$ irradiance profile at the sensor 20. In the case where uniform irradiance on the sensor 20 is required, the super-cosine intensity profile from optical element 10 then needs to obey a $\cos^{-7}\theta$ intensity distribution.

Radiation 15 scattered by the optical element 10 can propagate into space to illuminate field of view 16 located a distance dos away. In an aspect, the field of view 16 can be a flat screen.

Radiation 18 can be reflected from the field of view 16 and can be collected by a lens 19 and focused onto a sensor 20, such as a digital camera or CMOS sensor that are also included in the optical system 300. The lens 19 can also be located at a distance dos from the field of view 16. In practice the various distances illustrated in FIG. 7 can be different depending on the details of the particular system. Due to packaging constraints there is some offset, $d_{VS}$, between the sensor 20 and the light source 14 and optical element 10, although $d_{VS}$ is typically small relative to the distance from the optical element 10 to field of view 16.

To maximize utilization of optical energy it is desirable to illuminate only that portion of the field of view 16 required for the application so that the signal-to-noise ratio required for the sensing can be executed with minimal energy utilization. Such high illumination efficiency is beneficial in providing maximum battery lifetime, particularly for consumer-type devices such as mobile phones, tablets, and computers. In other words, optical systems 30, 300 require controlled illumination of the field of view 16 being scanned with radiation 15 with highest possible efficiency.

In principle, knowledge of the desired light distribution across the sensor 20 for a field of view 16 can enable determination of the intensity distribution emitted from the light source 14 and optical element 10 combination. For calculation purposes, assume that the field of view 16 is a Lambertian screen so that every part of the field of view 16 that is illuminated will scatter some radiation 18 back towards the sensor 20. Then, given the propagation geometry as shown in FIG. 6, the emission properties of the light source 14, the size of the field of view 16 to be illuminated, and the properties of the Lambertian screen 16, the intensity distribution from the optical element 10 can be determined as shown below.

In the optical system 300, a plurality of microstructures 13 of the optical element 10 can generate a super-cosine intensity profile I along the axis or dimension of interest, expressed by:

$$I(\theta) = \begin{cases} \dfrac{1}{\cos^p \theta}, & |\theta| \leq \theta_0 \\ 0, & |\theta| > \theta_0 \end{cases}$$

where p is a real number representing power. The case of uniform illumination in angle space corresponds to p=0, uniform irradiance at the field of view 16 corresponds to p=3, and p=7 for uniform irradiance at the sensor 20. While positive values of p are described others may also be desirable, including negative values, depending on the specific sensing application. While in most cases for 3D sensing, the value of p is a positive number to provide a higher level of illumination along the outer edge of the field of view relative to the center of the field of view. However, the value of p may be a negative number to provide a lower level of illumination along the outer edge relative to the center.

Figure 8:
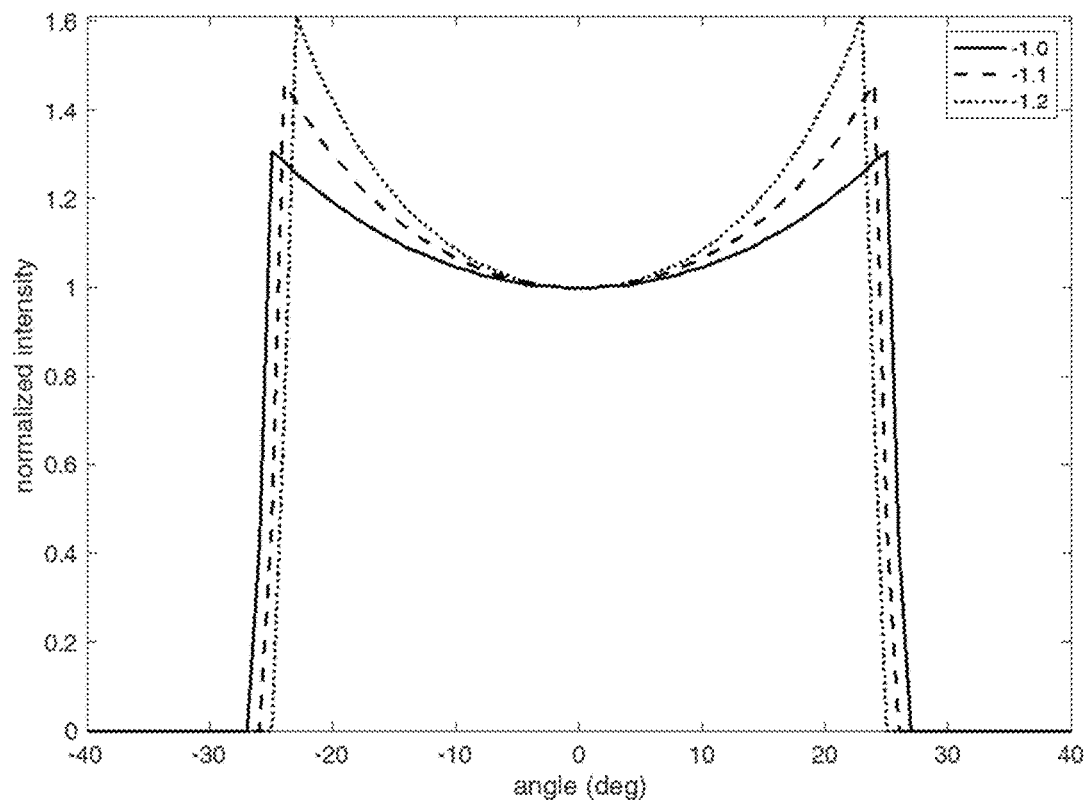
FIG. 8 is a graph of intensity over an angular field of view showing the effect of three different conic constant values k in providing a super cosine intensity profile.

Based on the sag profile of Eq. (2) one can calculate, via direct raytracing, several properties. The sag profile can generate intensity profiles that resemble super-cosine functions by using appropriate values of the conic constant. Consider, for example, the case of the microstructure 13 being a microlens of diameter 200 μm and radius of curvature 100 μm. The lens material can have an index of refraction 1.5. FIG. 8 shows the calculated intensity profile for three different values of k illustrating the fact that the more negative the k the stronger the edge intensity becomes compared to the center, which is the type of behavior observed for super-cosine intensity profiles with positive power p, for 3D sensing applications. In fact, by choosing the appropriate value k one can select the appropriate super-cosine intensity profile, depending on the field of view 16, and the index of refraction. Table I below shows the value k required to achieve a particular super-cosine intensity profile for various values of field of view angular range.

TABLE I

Value of k to achieve a field of view and super-cosine intensity profile for a material of index 1.5.

| | Super-cosine power | | | | |
|---|---|---|---|---|---|
| FOV (deg) | 1 | 3 | 5 | 7 | 9 |
| 40 | −0.8531 | −1.0106 | −1.1586 | −1.2969 | −1.4256 |
| 60 | −0.8761 | −1.0219 | −1.1455 | −1.2507 | −1.3384 |
| 80 | −0.9059 | −1.0318 | −1.1235 | −1.1894 | −1.2363 |
| 100 | −1.4009 | −1.0369 | −1.0936 | −1.1249 | −1.1375 |

Figure 9:
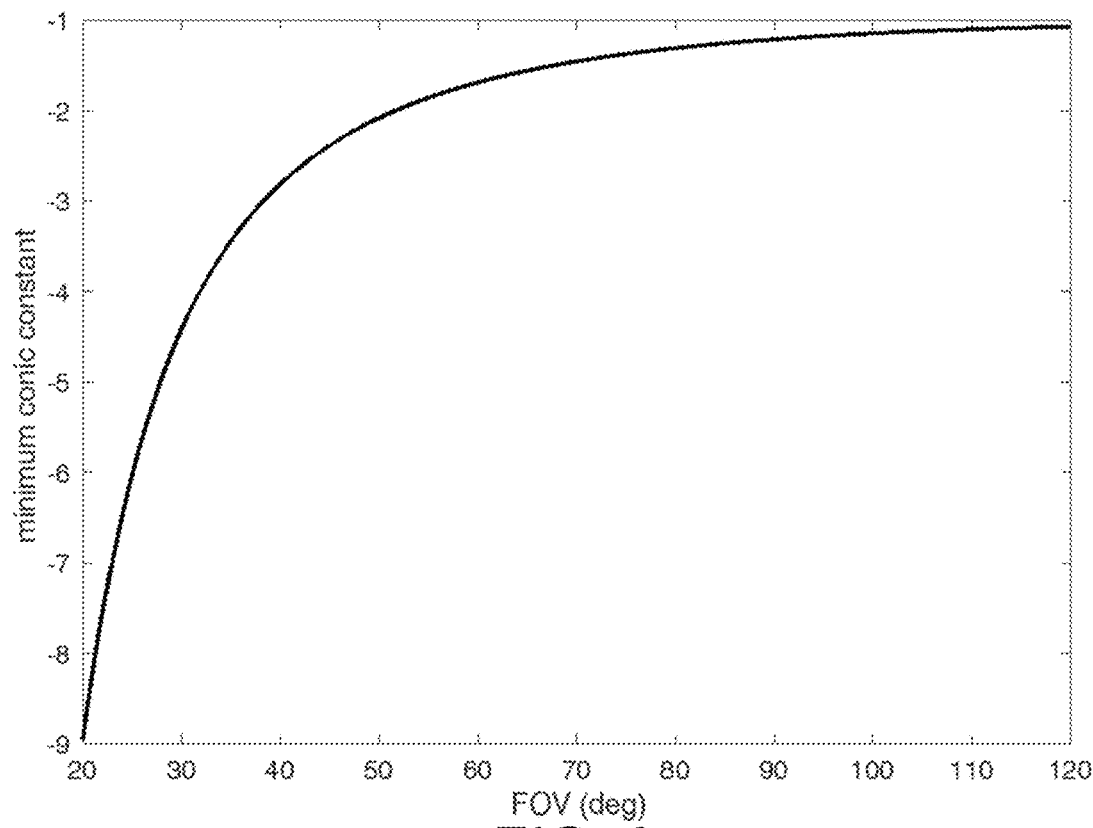
FIG. 9 is a graph of the minimum conic constant k as a function of field of view.

Note, however, that in the sag profile of Eq. (2) the value of k cannot be made indefinitely more negative as eventually that would lead to a non-physical lens profile. Indeed, for a given field of view one can calculate the minimum allowed value of k, shown in FIG. 9 and listed on Table II for various values of FOV, assuming a refractive index of 1.5.

TABLE II

Minimum conic constant k for various values of FOV for a material of index 1.5.

| FOV (deg) | k min |
|---|---|
| 20 | −8.9598 |
| 40 | −2.8127 |
| 60 | −1.6863 |
| 80 | −1.3055 |
| 100 | −1.1430 |
| 120 | −1.0673 |

Another sag profile that is suitable for each of the microstructures 13 of optical element 10 is based on the saddle lens profiles, as disclosed on U.S. Pat. No. 7,813,054, which is incorporated herein by reference. Different optical elements 10 having different values of p can be provided to an optical system to efficiently illuminate an area over a wide angular field of view. For example, the optical element 10 shown in FIGS. 3A and 3B can be used in 3D sensing systems or other optical systems.

Figure 10:
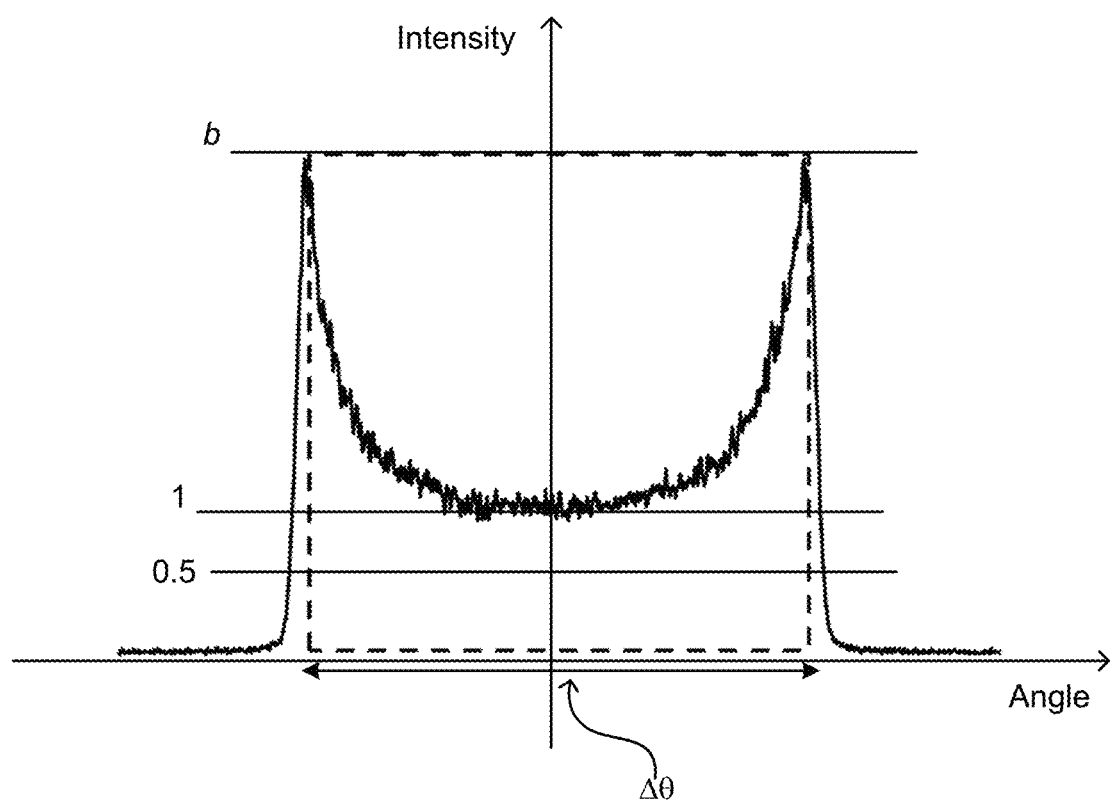
FIG. 10 is a graph of intensity over angular field of view measured from an optical element of FIGS. 3A and 3B when receiving collimated illumination, which shows the super-cosine intensity profile along one dimension.

In an optical system 30, 300, in order to provide the highest possible concentration of luminous energy, the plurality of microstructures 13 in optical element 10 can each individually spread radiation within the same angular range. Each microstructure 13 sag profile can be calculated analytically or by raytracing to ensure the desired angular spread. When this condition is imposed, all microstructures 13 spread light within a fixed angular field of view thus providing the best efficiency within the field of view. The intensity profile shown in FIG. 10 represents an optical element 10 having microstructures 13 of FIGS. 3A and 3B along one dimension across of the field of view. The intensity profile is normalized to 1 value along the intensity axis with respect to the center of the pattern. The FOV, indicated by the quantity $\Delta\theta$, can be defined at the half-point as indicated by the 0.5 level on the intensity axis. The maximum value in the normalized plot is b along the intensity axis, which would be equivalent to a super cosine power equal to $p=-\log b/\log(\cos \Delta\theta/2)$. Under a collimated light source 14, the fraction of energy that spreads beyond the target FOV can be fundamentally limited by diffraction. Other factors can also cause some energy to spread beyond the FOV such as surface roughness but these can be minimized with improved manufacturing, while the diffraction limitation cannot be overcome.

Figure 11:
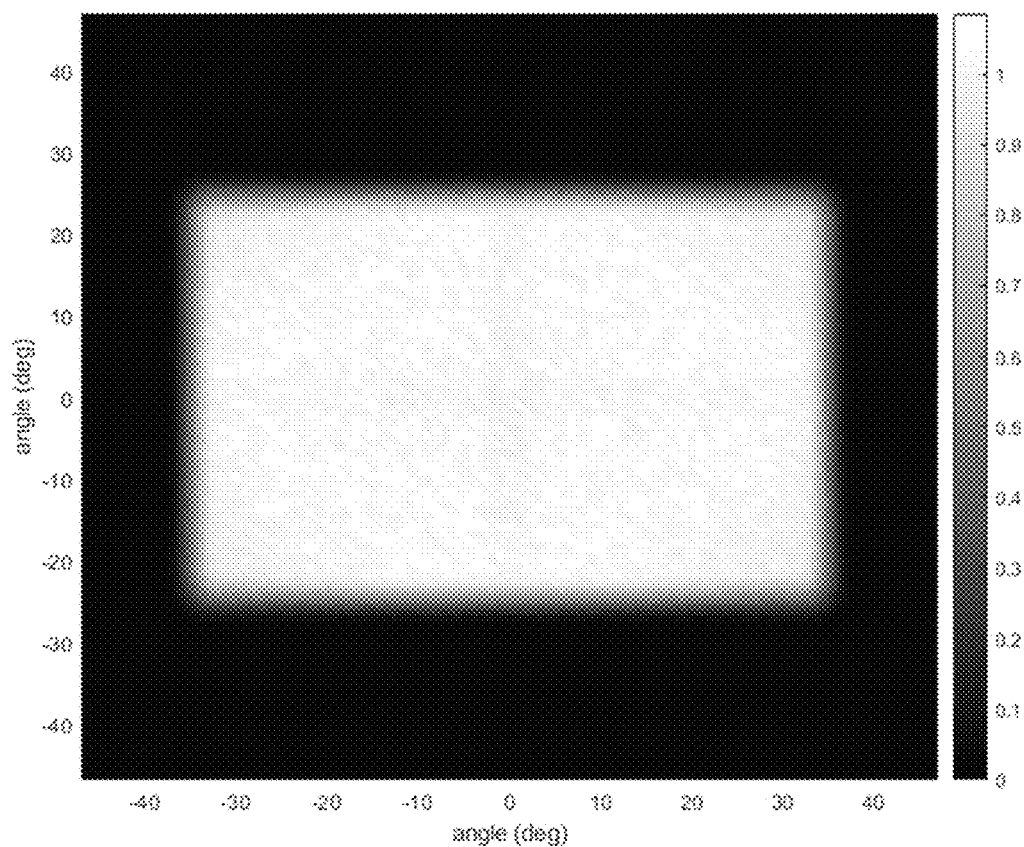
FIG. 11 is an irradiance pattern produced by the optical element of FIGS. 3A and 3B that produces a rectangular pattern when receiving collimated illumination.
Figure 12:
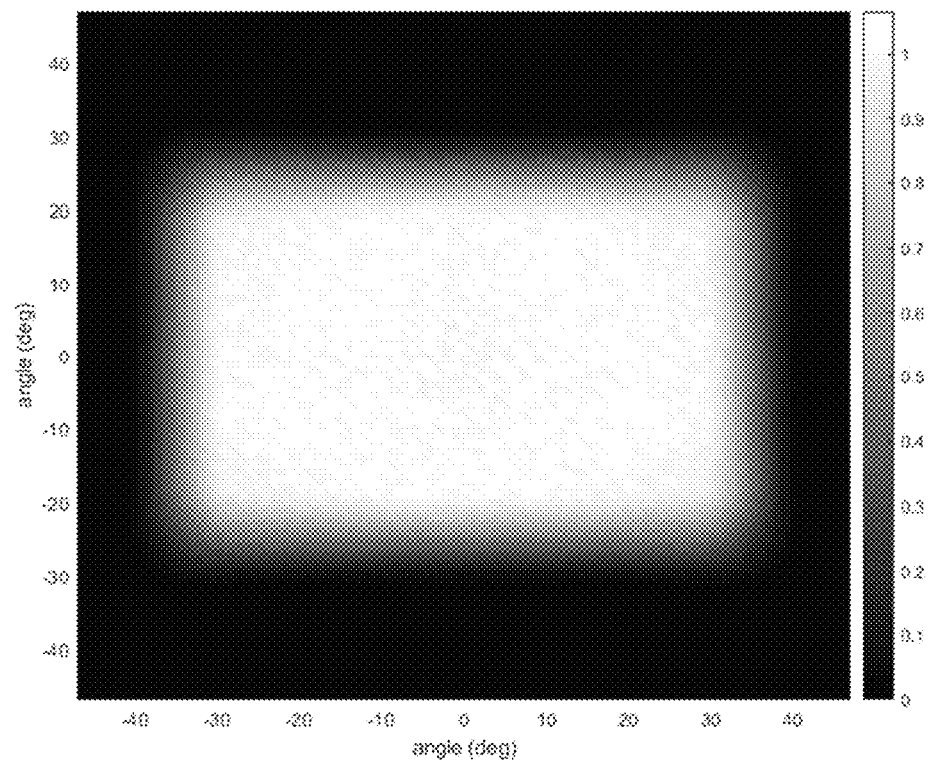
FIG. 12 is an irradiance pattern produced by the optical element of FIGS. 3A and 3B when receiving input illumination from a 15 degree diverging source.
Figure 13:
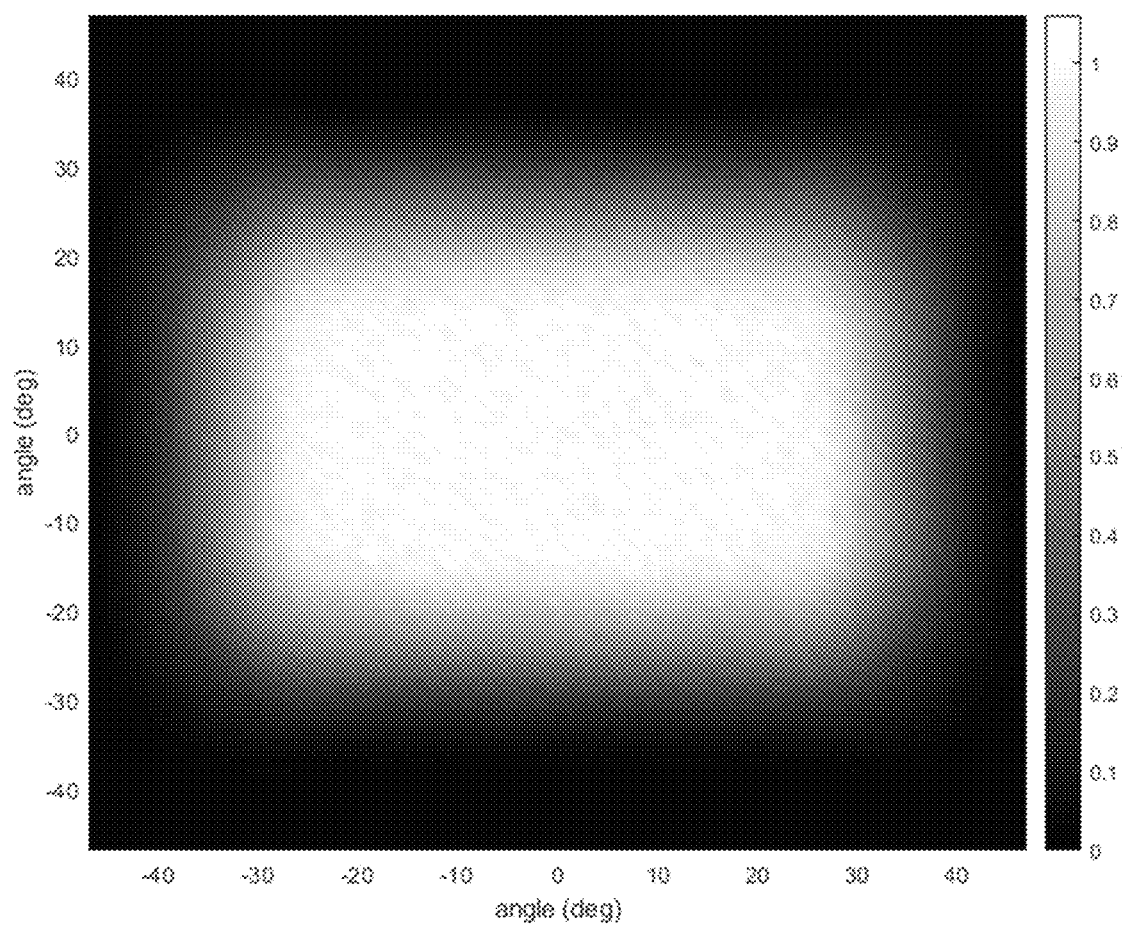
FIG. 13 is an irradiance pattern produced by the example optical element of FIGS. 3A and 3B when receiving input illumination from a 30 degree diverging source.

FIG. 11 illustrates the normalized irradiance pattern for the case of a two-dimensional example of an optical element 10 that can produce a super-cosine intensity profile with p=3, in the case of a collimated light source 14. As previously discussed, this is the case for uniform irradiance of a field of view 16 away from the optical element 10. The irradiance observed from the same optical element 10 when operating under diverging sources with the 15° and 30° sources are shown in FIGS. 12 and 13, respectively. As compared to FIG. 11, the illuminated area's outer edge (i.e., in a small angular range at each of the two opposite ends of the field of the view whose intensity is in accordance with the value of p of the super cosine intensity profile) increases in size with increasing divergence of light incident optical element 10.

Operation with a diverging light source 14 can cause a loss in target efficiency because the pattern width naturally increases due to the source divergence. An approximate estimate of how much the pattern spreads is calculated by the quantity $\sqrt{\theta^2+\sigma^2}$, where θ is the diffuser angle under collimated illumination and σ is the source angle. This expression, while strictly valid only for Gaussian diffusers and sources, can provide an initial estimate for the expected output from the optical element 10 receiving light from a diverging light source 14. So, for example, an optical element 10 that produces an output of 50 degrees under collimated input becomes 58.3 degrees under a 30-degree source. If the target is to concentrate as much energy as possible within the 50-degree FOV, the increase in FOV implies a reduction in total efficiency. While it is possible to maximize efficiency by providing an optical element 10 which takes into account the source divergence and compensating for it to some degree, some spread outside of the target area can happen with a diverging source, and complete elimination of its effect is generally not possible with a single-surface optical element 10.

Thus, the optical system 30, 300 can including an optical element 10 with super-cosine intensity profiles along opposing surfaces 12a,12b, as shown in FIG. 1. The microstructures 13 along each of the surfaces 12a and 12b are in confocal geometry one with the other. In this fashion, the microstructure 13 on surface 12b can acts as a field lens and can help reduce the effect of the diverging light source to improve divergence. In this kind of configuration, the separation between the surfaces 12a and 12b as well as the size of the microstructures 13 needs to be taken into consideration to provide the desired pattern along field of view 16, such as determined using numerical methods.

Figure 14:
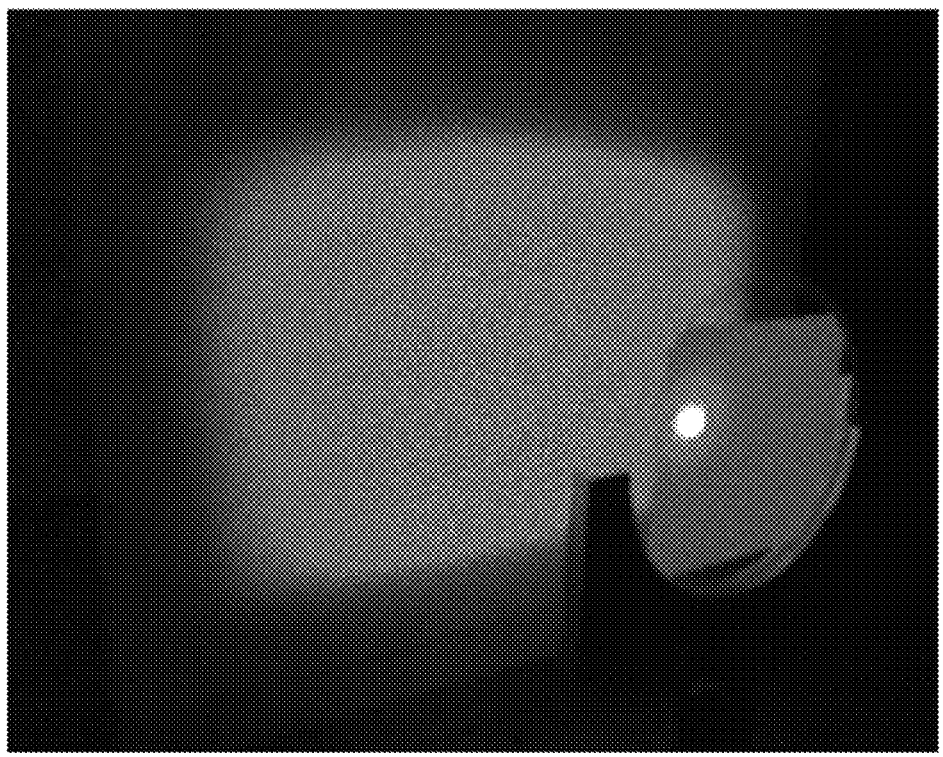
FIG. 14 is the projected irradiance pattern from an optical element (prior art) with poor edge definition.
Figure 15:
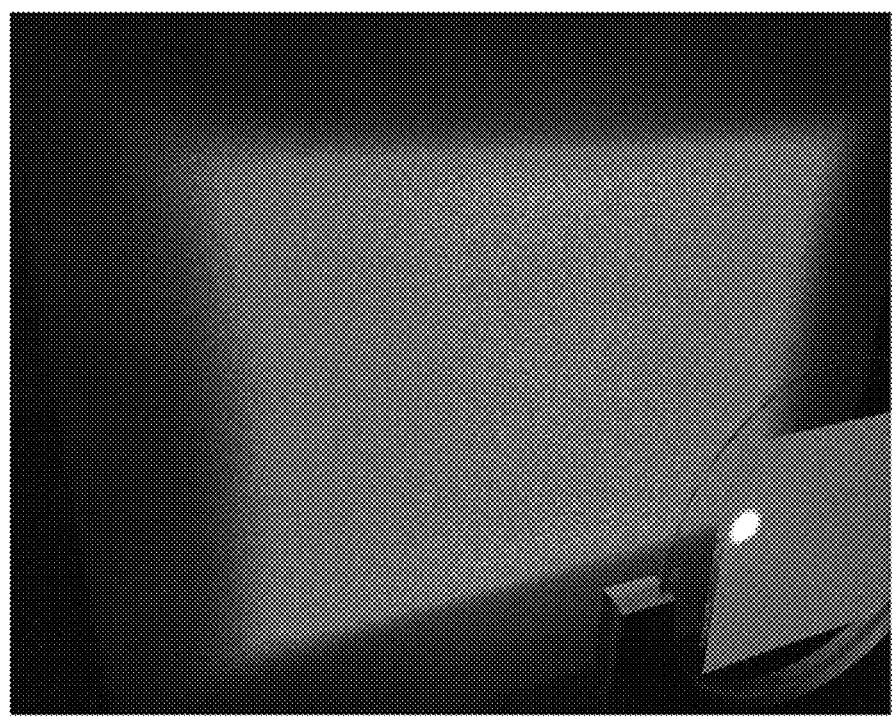
FIG. 15 is the projected irradiance pattern from an optical element of the present invention, where each microstructure of the plurality of microstructures has an outer boundary of a pincushion shape.

In addition to affecting efficiency a diverging light source 14 can also affect the pattern uniformity within the target field of view 16 because of the rounding of corners. This can be seen on FIGS. 12 and 13 compared with the collimated case of FIG. 11. This can be important in applications where pattern uniformity is a relevant parameter. Thus, to address this issue, the optical element 10 can project a pattern with intrinsic pincushion distortion under a collimated light source 14. Such distorted pattern, when operating with a diverging light source 14, leads to a pattern with better edge definition. An example from an actual measurement is shown in FIG. 14 showing a pattern without edge definition. An optical element 10 according to the present invention projecting a pincushion-distorted pattern is shown in FIG. 15 helps compensate for the effect of the diverging light source 14 and can produce a rectangular shape with better definition. The exact amount of pincushion distortion introduced by the optical element 10 depends on the divergence of the light source 14 and one can match the two parameters as closely as required by the requirements of the application.

To introduce a controlled amount of pincushion distortion in the shape produced by the optical element 10, the microstructures 13 can incorporate a pincushion outer boundary, as discussed above. In an aspect, a sag profile, such as that illustrated in Eq. (1), can be optimized to produce a pincushion pattern.

In another aspect, each microstructure 13 of the plurality of microstructures 13 can have a square shape with a side L, as shown in FIG. 16. The regular microstructure 13 boundary is indicated by the solid line that defines the square. The pincushion boundary is indicated by the dashed lines internal to the square pattern. An alternative approach is to define the pincushion externally to the square microstructure boundary.

The normalized amount of pincushion is measured by parameter ε, again with reference to FIG. 16. The standard square microstructure 13 boundary can result when ε equals zero. The standard square microstructure 13 can incorporate stronger pincushion distortion as ε increases. The exact boundary profile can be defined in a variety of ways, most of them substantially equivalent in terms of the projected diffusing pattern from optical element 10. In this example, assume the boundary to have a polynomial shape of the type (with proper axis orientation):

$$\left|\frac{x}{(L/2)}\right|^p + \left|\frac{y}{(L/2)}\right|^p = 1, \qquad (3)$$

where p is a real number. Thus where each of the above described randomized microstructures 13 on surface 12 is rectangular, such as square in the above example, with four outer boundaries, each of which inwardly curves towards a center of the microstructure so that each microstructure 13 has a pincushion geometric shape of desired degree or amount selected to improve illumination along the outer edges of the illuminated area of the field of view 16.

To illustrate the effect of the pincushion boundary the projected rectangular irradiance was calculated for an optical element 10 that generates a super-cosine intensity profile with power p of 3, suitable for uniform irradiance. The results are shown in FIGS. 17A-E in the form of contour maps. In this example, FIG. 17A indicated the output of optical element 10 with a collimated light source 14. In this case the projected irradiance has well-defined boundaries and sharp edges. FIG. 17B shows the same optical element 10 but now under a diverging 30 degree light source 14 as shown in FIG. 6B. One readily notices the rounded edges, in FIG. 17B. FIGS. 17C-E show the same optical element 10 for ε equal to 0.026, 0.056, and 0.091, respectively, showing the improvement in edge definition with an increase in pincushion parameter. The ε parameters are associated with the p parameters in Eq. (3) as follows: ε=0.026 (p=0.9), 0.056 (p=0.8), and 0.091 (p=0.7). In general, once the boundary shape was defined, such as by an expression of Eq. (3) or some other equivalent expression, the amount of pincushion to achieve the desired amount of correction to the projected pattern was numerically optimized.

The illuminated area can have any shape, such as a geometric shape. Non-limiting examples of geometric shapes include rectangular, circular, square, triangular, and the like. In an aspect, the illuminated area can represent a batwing intensity, where intensity is defined as a function of angle θ while irradiance is defined at a field of view 16.

There is also disclosed a method of using an optical system. The method includes radiating an optical element with energy from a light source, wherein the light source is a diverging light source; wherein the optical element includes a body of optical material, and a plurality of microstructures along a surface of the body, wherein each microstructure of the plurality of microstructures has a sag profile; and wherein each microstructure of the plurality of microstructures generates a super-cosine intensity profile that provides an irradiance over a field of view.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities and mechanical actions disclosed herein. For each composition, pigment, method, mean, mechanical element or mechanism disclosed, it is intended that this disclosure also encompass in its disclosure and teaches equivalents, means, systems and methods for practicing the many aspects, mechanisms and compositions disclosed herein. Additionally, this disclosure regards a composition and its many aspects, features and elements. Such a composition can be dynamic in its use and operation, this disclosure is intended to encompass the equivalents, means, systems and methods of the use of the composition and/or pigment of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical element comprising:
a body of optical material; and
a plurality of microstructures along a surface of the body, wherein each microstructure of the plurality of microstructures has a sag profile; and
wherein each microstructure is a modified geometric shape with four concave outer boundaries if viewed from an overhead view of the surface of the body from a point directly above the microstructure, wherein each of the four concave outer boundaries inwardly curves toward a center of the microstructure;
wherein the plurality of microstructures are randomly distributed along the surface.

2. The optical element according to claim 1, wherein the sag profile is s(x), where $$s(x) = \frac{x^2}{R + \sqrt{R^2 - (\kappa + 1)x^2}},$$

and R is a radius of curvature and k is a conic constant.

3. The optical element according to claim 1, wherein each microstructure has a pincushion shape.

4. The optical element according to claim 1, wherein the body has two surfaces which are oriented opposite one another.

5. An optical element comprising:
a body of optical material; and
a plurality of microstructures along a surface of the body, wherein each microstructure of the plurality of microstructures has a sag profile; and wherein each microstructure is a modified geometric shape with four concave outer boundaries if viewed from an overhead view of the surface of the body from a point directly above the microstructure, wherein each of the four concave outer boundaries inwardly curves toward a center of the microstructure,
wherein the body has two surfaces which are oriented opposite one another and each of the two surfaces includes a plurality of microstructures.

6. The optical element according to claim 5, wherein the plurality of microstructures is randomly distributed along the surface.

7. An optical system comprising:
a light source; and
an optical element having a body of optical material and a plurality of microstructures along a surface of the body, wherein each microstructure of the plurality of microstructures generates a super-cosine intensity profile that provides an irradiance over a field of view; and wherein each microstructure is a modified geometric shape with four concave outer boundaries if viewed from an overhead view of the surface of the body from a point directly above the microstructure, wherein each of the four concave outer boundaries inwardly curves toward a center of the microstructure,
wherein the super-cosine intensity profile is expressed by:

$$I(\theta) = \begin{cases} \frac{1}{\cos^p\theta}, & |\theta| \le \theta_0 \\ 0, & |\theta| > \theta_0 \end{cases}$$

where p is a real number representing power and wherein the irradiance over the field of view is uniform when p=3.

8. The optical system according to claim 7, wherein the light source is a diverging light source.

9. The optical system according to claim 8, wherein the diverging light source is chosen from a vertical cavity surface emitting laser, a side-emitting laser, and a light emitting diode.

10. The optical system according to claim 7, wherein the optical system also includes a lens and a sensor.

11. The optical system according to claim 7, wherein the plurality of microstructures is periodically distributed.

12. The optical system according to claim 7, wherein each microstructure of the plurality of microstructures has a pincushion shape.

13. An optical system comprising:
a light source; and
an optical element having a body of optical material and a plurality of microstructures along a surface of the body, wherein each microstructure of the plurality of microstructures generates a super-cosine intensity profile that provides an irradiance over a field of view; and wherein each microstructure is a modified geometric shape with four concave outer boundaries if viewed from an overhead view of the surface of the body from a point directly above the microstructure, wherein each of the four concave outer boundaries inwardly curves toward a center of the microstructure,
wherein the body has two surfaces which are oriented opposite one another, wherein each of the two surfaces includes a plurality of microstructures, wherein microstructures on a first of the two surfaces focuses radiation onto its corresponding microstructure on the second surface.

14. The optical system according to claim 13, wherein the super-cosine intensity profile is expressed by:

$$I(\theta) = \begin{cases} \frac{1}{\cos^p\theta}, & |\theta| \le \theta_0 \\ 0, & |\theta| > \theta_0 \end{cases}$$

where p is a real number representing power.

15. The optical system according to claim 14, wherein the irradiance over the field of view is uniform when p=3.

16. The optical system according to claim 14, wherein the value of p is a positive number to provide a higher level of illumination along an outer edge of the field of view relative to a center of the field of view.

17. The optical system according to claim 14, wherein the value of p is a negative number to provide a lower level of illumination along an outer edge of the field of view relative to a center of the field of view.

18. A method of using an optical system, comprising:
radiating an optical element with energy from a light source,
wherein the light source is a diverging light source;
wherein the optical element includes a body of optical material, and a plurality of microstructures along a surface of the body, wherein each microstructure of the plurality of microstructures has a sag profile; and
wherein each microstructure of the plurality of microstructures generates a super-cosine intensity profile that provides an irradiance over a field of view;
wherein each microstructure is a modified geometric shape with four concave outer boundaries if viewed from an overhead view of the surface of the body from a point directly above the microstructure, wherein each of the four concave outer boundaries inwardly curves toward a center of the microstructure; and
wherein the plurality of microstructures are randomly distributed along the surface.

\* \* \* \* \*